(12) United States Patent
Ardman et al.

(10) Patent No.: US 11,494,166 B2
(45) Date of Patent: *Nov. 8, 2022

(54) OMNI-CHANNEL CONVERSATIONAL APPLICATION DEVELOPMENT SYSTEM AND METHOD

(71) Applicant: Nuance Communications, Inc., Burlington, MA (US)

(72) Inventors: David Ardman, Cote Saint Luc (CA); Andrew Matkin, Bolton, MA (US); Nirvana Tikku, Brooklyn, NY (US); John B. Fisler, Rostraver Township, PA (US); Matthias Haack, Burlington, MA (US); Christopher A. Starbird, Hackensack, NJ (US); Bryan A. Reif, Boonton, NJ (US); Alfred Sterphone, III, Pompton Lakes, NJ (US); Nikos Polis, West Orange, NJ (US); Michael S. Gourlay, Waldwick, NJ (US); Robert A. Follett, Mountain Lakes, NJ (US)

(73) Assignee: NUANCE COMMUNICATIONS, INC., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/070,804

(22) Filed: Oct. 14, 2020

(65) Prior Publication Data
US 2021/0303280 A1 Sep. 30, 2021

Related U.S. Application Data

(60) Provisional application No. 63/002,145, filed on Mar. 30, 2020.

(51) Int. Cl.
*G06F 9/44* (2018.01)
*G06F 8/36* (2018.01)
(Continued)

(52) U.S. Cl.
CPC ............... *G06F 8/36* (2013.01); *G06F 8/33* (2013.01); *G06F 8/34* (2013.01); *G06F 8/38* (2013.01);
(Continued)

(58) Field of Classification Search
None
See application file for complete search history.

(56) References Cited

U.S. PATENT DOCUMENTS

| 6,120,549 | A  | 9/2000 | Goslin |
| 7,529,675 | B2 | 5/2009 | Maes   |

(Continued)

OTHER PUBLICATIONS

Conversational User Interface: Designing for Omnichannel Customer Experiences, Mar. 1, 2020 (Year: 2020).*
(Continued)

*Primary Examiner* — Insun Kang
(74) *Attorney, Agent, or Firm* — Brian J. Colandreo; Michael T. Abramson; Holland & Knight LLP

(57) ABSTRACT

A method, computer program product, and computing system for enabling a user to select a plurality of functional modules from a library of functional modules; and enabling the user to arrange the plurality of functional modules to form an omnichannel conversational application that includes a first channel and at least a second channel.

27 Claims, 11 Drawing Sheets

(51) Int. Cl.

| | | |
|---|---|---|
| *G06F 9/451* | (2018.01) | |
| *G06F 8/38* | (2018.01) | |
| *G10L 13/02* | (2013.01) | |
| *G10L 15/26* | (2006.01) | |
| *G06F 8/33* | (2018.01) | |
| *G06F 8/34* | (2018.01) | |
| *G06F 11/36* | (2006.01) | |
| *G10L 15/22* | (2006.01) | |
| *G06F 11/07* | (2006.01) | |
| *G06F 8/77* | (2018.01) | |
| *H04L 51/10* | (2022.01) | |
| *G10L 13/00* | (2006.01) | |

(52) U.S. Cl.
CPC ............... *G06F 8/77* (2013.01); *G06F 9/453* (2018.02); *G06F 11/0796* (2013.01); *G06F 11/3608* (2013.01); *G06F 11/3664* (2013.01); *G10L 13/02* (2013.01); *G10L 15/22* (2013.01); *G10L 15/26* (2013.01); *G10L 13/00* (2013.01); *H04L 51/10* (2013.01)

(56) References Cited

U.S. PATENT DOCUMENTS

| | | |
|---|---|---|
| 8,082,153 B2 | 12/2011 | Coffman |
| 9,043,747 B2 | 5/2015 | Eksten et al. |
| 9,081,411 B2 | 7/2015 | Kalns |
| 10,068,174 B2 | 9/2018 | Aili |
| 10,348,658 B2 | 7/2019 | Rodriguez |
| 10,460,728 B2 | 10/2019 | Anbazhagan |
| 10,620,948 B2 | 4/2020 | Brebner |
| 10,891,950 B2 | 1/2021 | Huang |
| 10,951,554 B1 | 3/2021 | Highman |
| 11,017,176 B2 | 5/2021 | Ayers |
| 11,055,119 B1 | 7/2021 | Silverstein |
| 11,074,039 B2 | 7/2021 | Kothari |
| 11,132,988 B1 | 9/2021 | Steedman Henderson et al. |
| 11,157,706 B2 | 10/2021 | Ayers |
| 11,249,731 B2 | 2/2022 | Bodin et al. |
| 11,258,735 B2 | 2/2022 | Perazzo |
| 2002/0194388 A1 | 12/2002 | Boloker |
| 2002/0198719 A1 | 12/2002 | Gergic |
| 2003/0088421 A1 | 5/2003 | Maes |
| 2005/0209878 A1 | 9/2005 | Fujino |
| 2008/0092109 A1 | 4/2008 | Kinnucan |
| 2010/0128296 A1 | 5/2010 | Denniston |
| 2010/0153925 A1 | 6/2010 | Klein |
| 2012/0198418 A1 | 8/2012 | Agarwal |
| 2013/0060962 A1 | 3/2013 | Wang et al. |
| 2014/0337814 A1* | 11/2014 | Kalns ................... G06F 8/00 717/100 |
| 2015/0279366 A1 | 10/2015 | Krestnikov |
| 2016/0026962 A1 | 1/2016 | Shankar |
| 2016/0028891 A1 | 1/2016 | Pirat |
| 2016/0034260 A1* | 2/2016 | Ristock ................... G06F 9/453 717/109 |
| 2018/0025503 A1 | 1/2018 | Tsai et al. |
| 2018/0053224 A1 | 2/2018 | McClave |
| 2018/0089572 A1 | 3/2018 | Aili et al. |
| 2018/0129484 A1 | 5/2018 | Kannan |
| 2018/0349970 A1 | 12/2018 | Balasubramanian |
| 2018/0367483 A1 | 12/2018 | Rodriguez |
| 2019/0042988 A1* | 2/2019 | Brown ................ G06F 16/9535 |
| 2019/0130905 A1 | 5/2019 | Bilgory |
| 2019/0138600 A1* | 5/2019 | Krishnan ............. G06F 3/0482 |
| 2019/0155905 A1 | 5/2019 | Bachrach |
| 2019/0213465 A1* | 7/2019 | Avrahami ............. G06N 3/006 |
| 2019/0236155 A1 | 8/2019 | Bachrach |
| 2019/0251165 A1 | 8/2019 | Bachrach |
| 2019/0304445 A1 | 10/2019 | Nahamoo |
| 2019/0340527 A1* | 11/2019 | Liden ..................... G06F 8/33 |
| 2019/0347319 A1 | 11/2019 | Goyal et al. |
| 2019/0347363 A1 | 11/2019 | Kishimoto |
| 2020/0126120 A1 | 4/2020 | Panchamgam |
| 2020/0159552 A1* | 5/2020 | Bodin ................... G06F 40/58 |
| 2020/0258521 A1* | 8/2020 | First ..................... G06F 8/38 |
| 2020/0320365 A1* | 10/2020 | Arat ..................... G06N 20/00 |
| 2020/0334740 A1* | 10/2020 | Bedell ............... G06F 16/90332 |
| 2020/0371755 A1 | 11/2020 | Patni |
| 2020/0387550 A1* | 12/2020 | Cappetta ............. G06F 16/9538 |
| 2021/0006515 A1 | 1/2021 | Downs |
| 2021/0089624 A1 | 3/2021 | Bealby-Wright |
| 2021/0132916 A1 | 5/2021 | Whitten |
| 2021/0133801 A1 | 5/2021 | Adibi |
| 2021/0158811 A1 | 5/2021 | Di Fabbrizio |
| 2021/0224845 A1 | 7/2021 | Doumar |
| 2021/0224870 A1 | 7/2021 | Doumar |
| 2021/0247974 A1* | 8/2021 | Gelfenbeyn ............. G06F 8/61 |
| 2021/0297531 A1* | 9/2021 | Karp ..................... G06F 9/547 |
| 2021/0303273 A1 | 9/2021 | Ardman et al. |
| 2021/0303275 A1 | 9/2021 | Ardman et al. |
| 2021/0303276 A1 | 9/2021 | Ardman et al. |
| 2021/0303277 A1 | 9/2021 | Ardman et al. |
| 2021/0303392 A1 | 9/2021 | Ardman et al. |

OTHER PUBLICATIONS

Non-Final Office Action issued in U.S. Appl. No. 17/070,841 dated Sep. 15, 2021.
Non-Final Office Action issued in U.S. Appl. No. 17/070,829 dated Sep. 21, 2021.
Non-Final Office Action issued in U.S. Appl. No. 17/070,851 dated Dec. 20, 2021.
Notice of Allowance issued in U.S. Appl. No. 17/070,829 dated Jan. 11, 2022.
Non-Final Office Action in U.S. Appl. No. 17/070,788 dated Jan. 21, 2022.
Final Office Action issued in U.S. Appl. No. 17/070,841 dated Mar. 9, 2022.
Final Office Action issued in U.S. Appl. No. 17/070,851 dated May 12, 2022.
Notice of Allowance issued in U.S. Appl. No. 17/070,841 dated May 19, 2022.
Final Office Action issued in U.S. Appl. No. 17/070,788 dated May 25, 2022.
"What is Omni-channel Communications?", Retrieved From: https://web.archive.org/web/20200811075342/https://www.mitel.com/features-benefits/omnichannel, Aug. 11, 2020, 4 Pages.
"Advisory Action Issued in U.S. Appl. No. 17/070,788", dated Aug. 12, 2022, 5 Pages.
"Notice of Allowance Issued in U.S. Appl. No. 17/070,788", dated Sep. 1, 2022, 10 Pages.
"Notice of Allowance Issued in U.S. Appl. No. 17/070,829", dated Apr. 11, 2022, 2 Pages.
"Notice of Allowance Issued in U.S. Appl. No. 17/070,841", dated Aug. 10, 2022, 8 Pages.
"Non Final Office Action Issued in U.S. Appl. No. 17/070,851", dated Sep. 2, 2022, 23 Pages.
Bradley, E., "Error—Omnichannel Ongoing Conversations dashboard", Retrieved From: https://community.dynamics.com/365/customerservice/f/dynamics-365-for-customer-service-forum/380037/error—omnichannel-ongoing-conversations-dashboard#:~:text=This%20error%20is%20apparently%20caused,url%20when%20the%20error%20appears, Feb. 11, 2020, 5 Pages.

* cited by examiner

OMNI-CHANNEL CONVERSATIONAL APPLICATION DEVELOPMENT SYSTEM AND METHOD

RELATED APPLICATION(S)

This application claims the benefit of U.S. Provisional Application No. 63/002,145, filed on 30 Mar. 2020, the entire contents of which is herein incorporated by reference.

TECHNICAL FIELD

This disclosure relates to development systems and methods and, more particularly, to conversational application development systems and methods.

BACKGROUND

As is known in the art, companies are moving toward automated/intelligent systems that interact with users and respond to user inquires without the need (or expense) of human involvement. Accordingly and through the use of various communication channels (e.g., an IVR channel, an SMS channel, a Mobile-Based Channel, a Web-Based Channel), automated systems may be developed that intelligently interact with end users.

Unfortunately and when designing such automated/intelligent systems, multiple discrete systems may be required (e.g., one system for writing code and/or designing modules, another system for compiling code (if needed) to generate a runtime, another system to test the runtime, another system to gather data during runtime, and another system to present the gathered data to the user). Unfortunately and by requiring the use of so many discrete systems, efficiency may suffer, as the user is required to learn multiple systems, maintain multiple systems, and repeatedly switch between multiple systems

SUMMARY OF DISCLOSURE

An Omni-Channel Development Platform

In one implementation, a computer-implemented method is executed on a computing device and includes: enabling a user to select a plurality of functional modules from a library of functional modules; and enabling the user to arrange the plurality of functional modules to form an omnichannel conversational application that includes a first channel and at least a second channel.

One or more of the following features may be included. The first channel and at least a second channel may include two or more of: an IVR channel; an SMS channel; a mobile-based channel; and a web-based channel. The omnichannel conversational application may include one or more of: an audio-based communication modality; and a visual-based communication modality. The audio-based communication modality may include one or more of: recorded audio segment functionality; and text-to-speech functionality. The visual-based communication modality may include one or more of: JSON text-based functionality; and HTML/SSML text-based functionality. An end user may be enabled to initiate a session of the omnichannel conversational application in the first channel and subsequently switch the session of the omnichannel conversational application to the at least a second channel. The library of functional modules may include: one or more predefined functional modules; and one or more user-defined functional modules. The user may be enabled to define the one or more user-defined functional modules. Enabling the user to arrange the plurality of functional modules to form an omnichannel conversational application that includes a first channel and at least a second channel may include: enabling the user to visually arrange the plurality of functional modules to form the omnichannel conversational application that includes the first channel and at least a second channel. Enabling the user to visually arrange the plurality of functional modules to form the omnichannel conversational application that includes the first channel and at least a second channel may include: enabling the user to visually arrange the plurality of functional modules to define a logic flow for the omnichannel conversational application that includes the first channel and at least a second channel.

In another implementation, a computer program product resides on a computer readable medium and has a plurality of instructions stored on it. When executed by a processor, the instructions cause the processor to perform operations including: enabling a user to select a plurality of functional modules from a library of functional modules; and enabling the user to arrange the plurality of functional modules to form an omnichannel conversational application that includes a first channel and at least a second channel.

One or more of the following features may be included. The first channel and at least a second channel may include two or more of: an IVR channel; an SMS channel; a mobile-based channel; and a web-based channel. The omnichannel conversational application may include one or more of: an audio-based communication modality; and a visual-based communication modality. The audio-based communication modality may include one or more of: recorded audio segment functionality; and text-to-speech functionality. The visual-based communication modality may include one or more of: JSON text-based functionality; and HTML/SSML text-based functionality. An end user may be enabled to initiate a session of the omnichannel conversational application in the first channel and subsequently switch the session of the omnichannel conversational application to the at least a second channel. The library of functional modules may include: one or more predefined functional modules; and one or more user-defined functional modules. The user may be enabled to define the one or more user-defined functional modules. Enabling the user to arrange the plurality of functional modules to form an omnichannel conversational application that includes a first channel and at least a second channel may include: enabling the user to visually arrange the plurality of functional modules to form the omnichannel conversational application that includes the first channel and at least a second channel. Enabling the user to visually arrange the plurality of functional modules to form the omnichannel conversational application that includes the first channel and at least a second channel may include: enabling the user to visually arrange the plurality of functional modules to define a logic flow for the omnichannel conversational application that includes the first channel and at least a second channel.

In another implementation, a computing system includes a processor and memory is configured to perform operations including: enabling a user to select a plurality of functional modules from a library of functional modules; and enabling the user to arrange the plurality of functional modules to form an omnichannel conversational application that includes a first channel and at least a second channel.

One or more of the following features may be included. The first channel and at least a second channel may include two or more of: an IVR channel; an SMS channel; a mobile-based channel; and a web-based channel. The omnichannel conversational application may include one or more of: an audio-based communication modality; and a visual-based communication modality. The audio-based communication modality may include one or more of: recorded audio segment functionality; and text-to-speech functionality. The visual-based communication modality may include one or more of: JSON text-based functionality; and HTML/SSML text-based functionality. An end user may be enabled to initiate a session of the omnichannel conversational application in the first channel and subsequently switch the session of the omnichannel conversational application to the at least a second channel. The library of functional modules may include: one or more predefined functional modules; and one or more user-defined functional modules. The user may be enabled to define the one or more user-defined functional modules. Enabling the user to arrange the plurality of functional modules to form an omnichannel conversational application that includes a first channel and at least a second channel may include: enabling the user to visually arrange the plurality of functional modules to form the omnichannel conversational application that includes the first channel and at least a second channel. Enabling the user to visually arrange the plurality of functional modules to form the omnichannel conversational application that includes the first channel and at least a second channel may include: enabling the user to visually arrange the plurality of functional modules to define a logic flow for the omnichannel conversational application that includes the first channel and at least a second channel.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

System Overview

Figure 1:
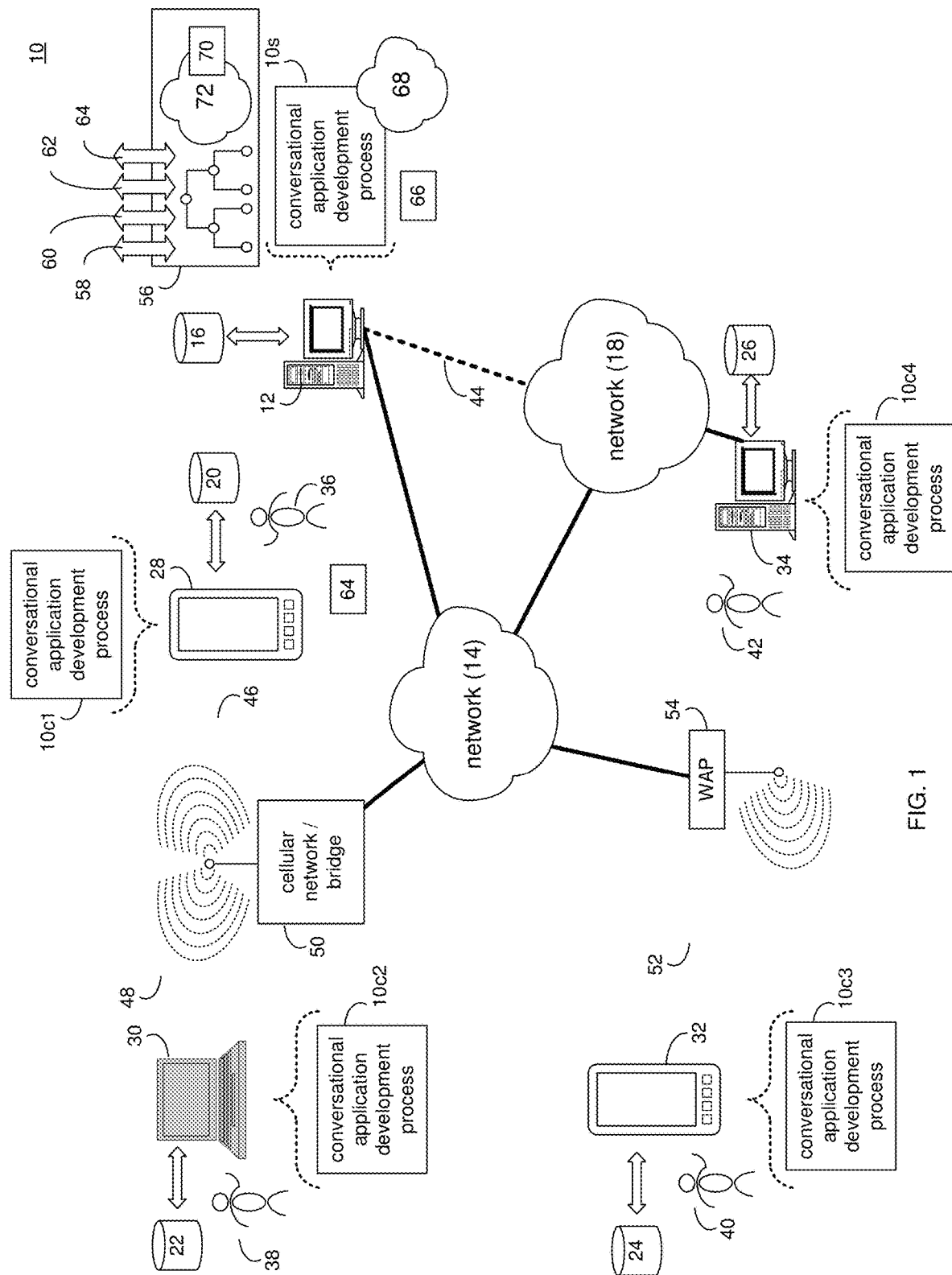
FIG. 1 is a diagrammatic view of a distributed computing network including a computing device that executes a conversational application development process according to an embodiment of the present disclosure.

Referring to FIG. 1, there is shown conversational application development process 10. As will be discussed below in greater detail, conversational application development process 10 may be configured to enable the generation, testing and deployment of conversational applications.

Conversational application development process 10 may be implemented as a server-side process, a client-side process, or a hybrid server-side/client-side process. For example, conversational application development process 10 may be implemented as a purely server-side process via conversational application development process 10s. Alternatively, conversational application development process 10 may be implemented as a purely client-side process via one or more of conversational application development process 10c1, conversational application development process 10c2, conversational application development process 10c3, and conversational application development process 10c4. Alternatively still, conversational application development process 10 may be implemented as a hybrid server-side/client-side process via conversational application development process 10s in combination with one or more of conversational application development process 10c1, conversational application development process 10c2, conversational application development process 10c3, and conversational application development process 10c4. Accordingly, conversational application development process 10 as used in this disclosure may include any combination of conversational application development process 10s, conversational application development process 10c1, conversational application development process 10c2, conversational application development process 10c3, and conversational application development process 10c4.

Conversational application development process 10s may be a server application and may reside on and may be executed by computing device 12, which may be connected to network 14 (e.g., the Internet or a local area network). Examples of computing device 12 may include, but are not limited to: a personal computer, a laptop computer, a personal digital assistant, a data-enabled cellular telephone, a notebook computer, a television with one or more processors embedded therein or coupled thereto, a cable/satellite receiver with one or more processors embedded therein or coupled thereto, a server computer, a series of server computers, a mini computer, a mainframe computer, or a cloud-based computing network.

The instruction sets and subroutines of conversational application development process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of conversational application development processes 10c1, 10c2, 10c3, 10c4 may include but are not limited to a client application, a web browser, or a specialized application (e.g., an application running on e.g., the Android™ platform or the iOS platform). The instruction sets and subroutines of conversational application development processes 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: a hard disk drive; a RAID device; a random access memory (RAM); a read-only memory (ROM); and all forms of flash memory storage devices.

Examples of client electronic devices 28, 30, 32, 34 may include, but are not limited to, data-enabled, cellular telephone 28, laptop computer 30, personal digital assistant 32, personal computer 34, a notebook computer (not shown), a server computer (not shown), a gaming console (not shown), a smart television (not shown), and a dedicated network device (not shown). Client electronic devices 28, 30, 32, 34 may each execute an operating system, examples of which may include but are not limited to Microsoft Windows™, Android™, WebOS™, iOS™, Redhat Linux™, or a custom operating system.

Users 36, 38, 40, 42 may access conversational application development process 10 directly through network 14 or through secondary network 18. Further, conversational application development process 10 may be connected to network 14 through secondary network 18, as illustrated with link line 44.

The various client electronic devices (e.g., client electronic devices 28, 30, 32, 34) may be directly or indirectly coupled to network 14 (or network 18). For example, data-enabled, cellular telephone 28 and laptop computer 30 are shown wirelessly coupled to network 14 via wireless communication channels 46, 48 (respectively) established between data-enabled, cellular telephone 28, laptop computer 30 (respectively) and cellular network/bridge 50, which is shown directly coupled to network 14. Further, personal digital assistant 32 is shown wirelessly coupled to network 14 via wireless communication channel 52 established between personal digital assistant 32 and wireless access point (i.e., WAP) 54, which is shown directly coupled to network 14. Additionally, personal computer 34 is shown directly coupled to network 18 via a hardwired network connection.

WAP 54 may be, for example, an IEEE 802.11a, 802.11b, 802.11g, 802.11n, Wi-Fi, and/or Bluetooth device that is capable of establishing wireless communication channel 52 between personal digital assistant 32 and WAP 54. As is known in the art, IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Overview of Conversational Application Development System

Figure 2:
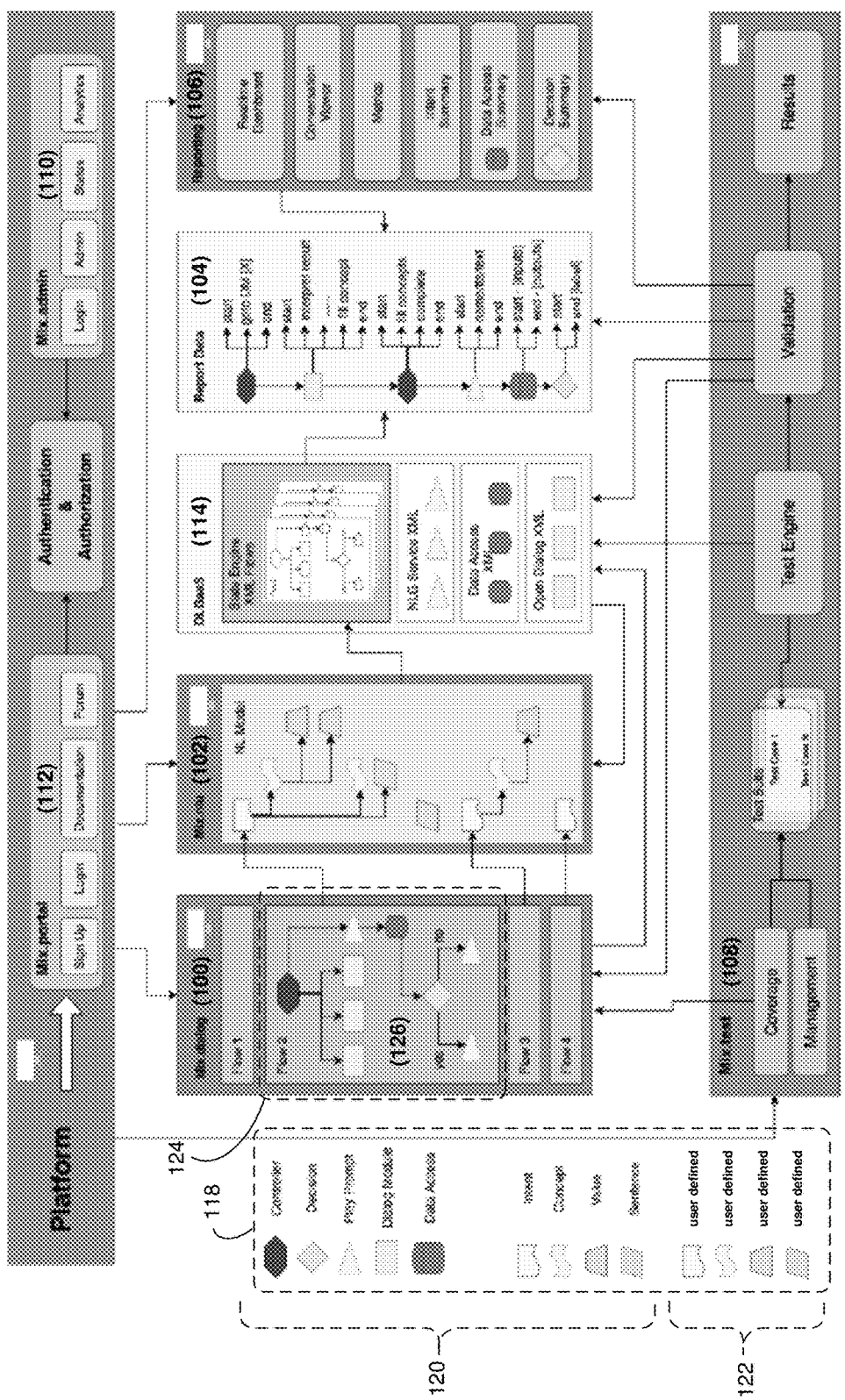
FIG. 2 is a diagrammatic view of the conversational application development process of FIG. 1 according to an embodiment of the present disclosure.

Referring also to FIG. 2, there is shown a diagrammatic view of one implementation of conversational application development process 10. Conversational application development process 10 is an end-to-end solution for the creation, deployment, administration, and optimization of conversational applications.

As is known in the art, conversational applications (e.g., conversational application 56) are applications that allow businesses to communicate with their customers without the need for human involvement.

Examples of a conversational application (e.g., conversational application 56) may include but are not limited to:
  an intelligent text-based system in which a customer may send inquires to the conversational application (e.g., conversational application 56) via text messages, wherein the conversational application (e.g., conversational application 56) may process these text messages and provide text-based responses concerning the same.
  an intelligent voice-based system in which a customer may make voice-based inquires of the conversational application (e.g., conversational application 56), wherein the conversational application (e.g., conversational application 56) may process these voice-based inquires and provide voice-based responses concerning the same.

Conversational application development process 10 may combine capabilities and best practices across the voice and digital spaces, thus allowing users of conversational application development process 10 to build and manage conversational applications (e.g., conversational application 56) for all channels in one place (with the flexibility to deploy in an on-premises environment or in a hosted environment).

Users of conversational application development process 10 (from beginners to experts) may be able to "design once/deploy many" when appropriate and may also be able to branch architecture and verbiage based upon channel for the optimal user experience.

Examples of such channels may include but are not limited to:
  IVR channel 58: As is known in the art, IVR (Interactive Voice Response) is a technology that allows humans to interact with a computer-operated phone system through the use of voice and DTMF (Dual-Tone Multi-Frequency) tones input via a keypad. In telecommunications, IVR may allow customers to interact with a host system via a telephone keypad and/or speech recognition, after which services may be inquired about through an IVR dialogue. IVR systems may respond with prerecorded messages and/or dynamically generated audio to further direct users as to how to proceed. Accordingly, conversational application development process 10 may be configured to develop conversational applications (e.g., conversational application 56) that allow communication via such an IVR channel.
  SMS channel 60: As is known in the art, SMS (short message service) is a technology that uses standardized communication protocols to enable the exchange of short text messages between devices. Therefore, an SMS system may be configured to allow a customer to interact with a computer-operated customer service system, wherein the customer may submit text-based inquires and the computer-operated customer service system may respond to the same (via e.g., text-based responses). Accordingly, conversational application development process 10 may be configured to develop conversational applications (e.g., conversational application 56) that allow communication via such an SMS channel Mobile-Based Channel 62: As is known in the art, mobile applications (such as those executed on client electronic devices 28, 32) may be configured to allow a customer to interact with a computer-operated customer service system, wherein the customer may submit text-based and/or voice-based inquires and the computer-operated customer service system may respond to the same (via e.g., text-based and/or voice-based responses). Accordingly, conversational application development process 10 may be configured to develop conversational applications (e.g., conversational application 56) that allow communication via such a mobile-based channel.

Web-Based Channel 64: As is known in the art, web browser applications (e.g., Firefox™, Chrome™, Edge™) such as those executed on client electronic devices 28, 30, 32, 34 may be configured to allow a customer to interact with a computer-operated customer service system, wherein the customer may submit text-based and/or voice-based inquires and the computer-operated customer service system may respond to the same (via e.g., text-based and/or voice-based responses). Accordingly, conversational application development process 10 may be configured to develop conversational applications (e.g., conversational application 56) that allow communication via such a web-based channel.

The Dialog Design Modeling tool (e.g., Mix.dialog 100) and/or ASR/NLU Modeling tool (e.g., Mix.nlu 102) may allow a user to define an entire user experience (including e.g., what a user of the system (e.g., conversational application 56) may say to (or type to) an IVR or virtual assistant, as well as what the system (e.g., conversational application 56) may say (or type) in response to an inquiry.

Conversational application development process 10 may generate runtime based upon the design defined via the Dialog Design Modeling tool (e.g., Mix.dialog 100) and/or ASR/NLU Modeling tool (e.g., Mix.nlu 102). As is known in the art, runtime is the period of time during which a program is running and the final phase of the program lifecycle (during which the machine executes the program code). The resulting code that is generated by conversational application development process 10 may be human-readable and may match each state in the Dialog Design Modeling tool (e.g., Mix.dialog 100).

The runtime may generate verbose breadcrumb report data (e.g., report data 104 for utilization by reporting tool 106 of conversational application development process 10) that may be based upon the design, wherein each state that exists in the design may be automatically represented in the reporting data (e.g., report data 104).

A testing tool (e.g., Mix.test 108) of conversational application development process 10 may allow a user of conversational application development process 10 to rapidly create test cases based upon the design of e.g., conversational application 56. Because the Testing tool (e.g., Mix.test 108) and Dialog Design tool (e.g., Mix.dialog 100) are connected, users of conversational application development process 10 may view their test coverage, wherein each test case may validate the design, runtime, report data, and reports (i.e., the complete, end-to-end pipeline).

Access and Administration

Mix.admin

Mix.admin 110 of conversational application development process 10 may function as a self-service portal and an entry point into conversational application development process 10. Through Mix.admin 110, users may be able to sign up to use conversational application development process 10. Once signed up and logged in, users of conversational application development process 10 may have access to various functionality (e.g., online documentation, user forums, help discussions; not shown)

Mix.portal

Mix.portal 112 of conversational application development process 10 may be configured to provide management functionality for administrators of conversational application development process 10 and may provide administrators with the ability to limit the permissions/rights/privileges of the users of conversational application development process 10.

Through the use of Mix.portal 112, administrators may quickly and easily set up users on conversational application development process 10. Additionally/alternatively, users may sign up (using SSO if applicable) and onboard via the Self-Service Portal of Mix.portal 112. As is known in the art, single sign-on (SSO) is an authentication methodology that allows a user to log in (via a single ID and password) to any of several related, yet independent, software systems. Once logged in, users may obtain product documentation, participate in discussion forums, and/or share data/information with other users. Further, designated users (e.g., administrators) may access a management portal (not shown) that may allow these administrators to e.g., assign roles and permissions to other users, and monitor the behavior of users within the platform.

Mix.dialog and Development

Mix.dialog 100 of conversational application development process 10 may be a multichannel dialog design development tool for creating conversational experiences that may be achievable via a conversational application (e.g., conversational application 56). As discussed above, examples of such conversational applications may include but are not limited to: an intelligent text-based system in which a customer may send inquires to the conversational application (e.g., conversational application 56) via text messages, wherein the conversational application (e.g., conversational application 56) may process these text messages and provide text-based responses concerning the same; and an intelligent voice-based system in which a customer may make voice-based inquires of the conversational application (e.g., conversational application 56), wherein the conversational application (e.g., conversational application 56) may process these voice-based inquires and provide voice-based responses concerning the same.

Through the use of a user-friendly drag-and-drop design/development GUI, users of Mix.dialog 100 of conversational application development process 10 may e.g., write sample dialogs, create application flows, and specify all conversational details, such as verbiage, logic, web-service calls, etc. Users of Mix.dialog 100 may preview their designs using a voice and/or chat interface to confirm the desired experience. Each of these views within the GUI may be connected, which may ensure that sample dialogs, flows, and details are always in sync, and that every stakeholder understands and participates in the design process. Mix.dialog 100 may allow nonspecialized users to create and/or edit simple conversational experiences (such as FAQs), and may also allow experts to create more complex dialogs (such as personalized, multi-turn transactions). These dialogs may be shared across channels (e.g., IVR channel 58, SMS channel 60, Mobile-Based Channel 62, Web-Based Channel 64) by default. However, if a particular channel (e.g., IVR channel 58, SMS channel 60, Mobile-Based Channel 62, or Web-Based Channel 64) requires a specialized flow (or a unique prompting), users may easily branch their design to accommodate the additional channel(s).

Accordingly and through the use of Mix.dialog 100 of conversational application development process 10, multiple users of conversational application development process 10 may collaborate on the design of the conversational application (e.g., conversational application 56) through e.g., locking mechanisms that may prevent more than one user from updating a state at the same time. Users may also be able to exchange notes for one another within Mix.dialog 100, flagging areas of the design for further review or clarification. Users of Mix.dialog 100 may also design the conversational application (e.g., conversational application 56) for multiple languages (within the same application) while sharing the same flow with localized verbiage (or may branch based on language if necessary).

Mix.nlu and ASR Modeling

Mix.nlu 102 of conversational application development process 10 may offer users a great deal of flexibility in the interpretation of end user text and speech inputs. Specifically, users of Mix.nlu 102 may create designs that use a single language model (which may be typical of virtual assistants). For example, users may select from a number of vertical-specific domain language models to use within the conversational application (e.g., conversational application 56), or they may create their own domain language models through bootstrapping and/or data collection.

Figure 3:
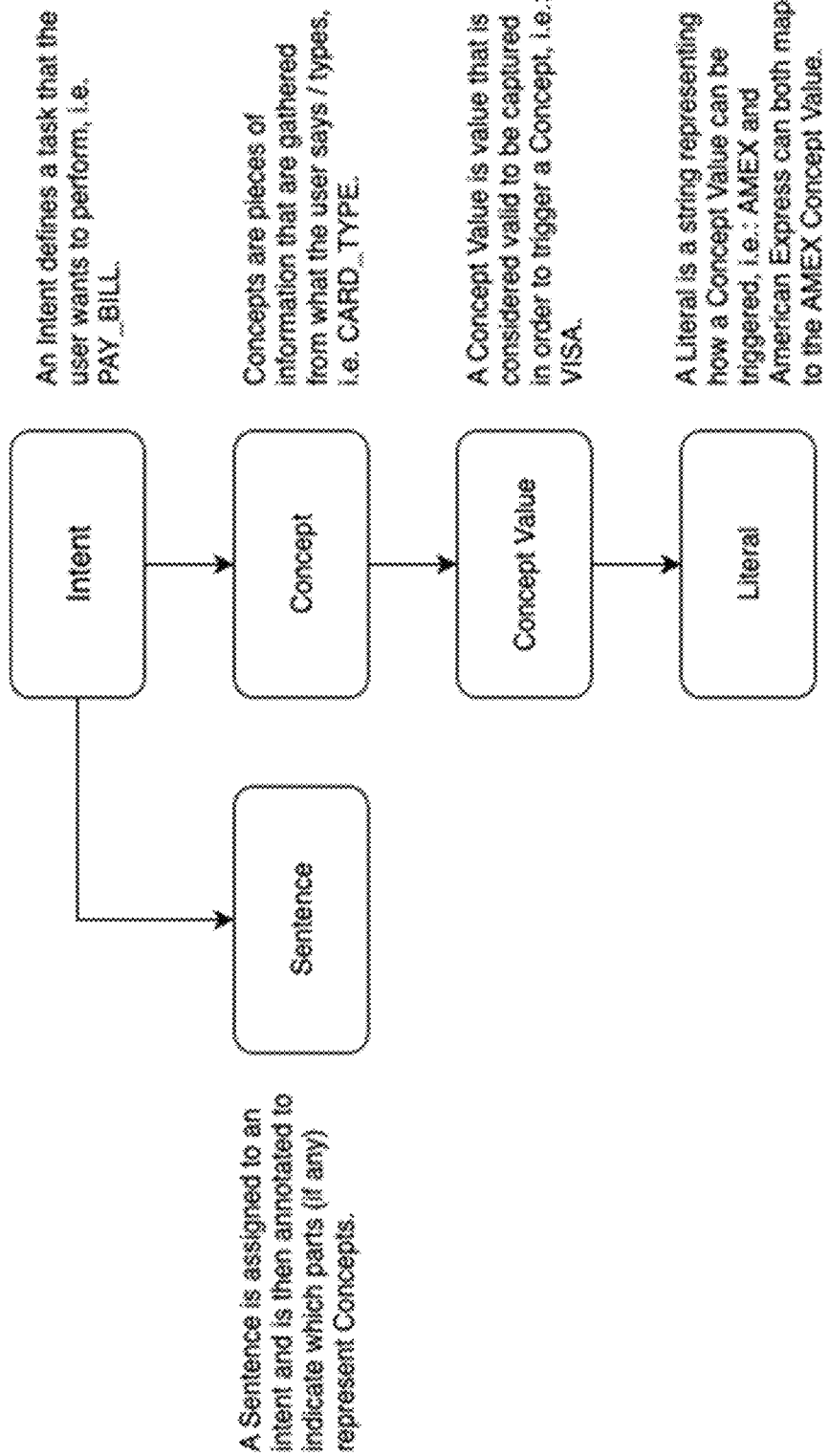
FIG. 3 is a diagrammatic view of a natural language model generated by the conversational application development process of FIG. 1 according to an embodiment of the present disclosure.

Referring also to FIG. 3 and using a NL (Natural Language) view, users of Mix.nlu 102 of conversational application development process 10 may define the ontology of the natural language model by e.g., creating intents, concepts and concept values. These elements are may then be used during intent assignment and sentence annotation to help build the dataset that will be used to create the NL model.

Each intent created using Mix.nlu 102 of conversational application development process 10 may be associated with zero or more concepts in order to define the type of information that the user should provide to complete the desired operation. Concepts may have many different values that themselves represent the information the end user provides (e.g.: Concept→CARD_TYPE, Concept Value→MasterCard).

When pulling data from production (e.g., via the feedback loop) or adding sentences manually, the ontology may be used to assign an intent to a sentence and then annotate the sentence with all the Concepts/Concept Values present. The ontology definition may then be fed into the Dialog Design view, where users may create dialogs or routing behaviors for each intent using the concepts and concept values.

If a closed (directed dialog) grammar is deemed necessary (which is typical in today's Interactive Voice Response systems), the users may reference GRXML grammar files, or may create them in the NLU and ASR Design view. Applications may be created using only closed grammars (whether speech or Dual-Tone Multi-Frequency), using only open grammars, or using a combination of closed and open grammars, to yield the best possible recognition capabilities.

Dialog Runtime-DLGaaS

DLGaaS 114 (i.e., the dialog runtime) of conversational application development process 10 may consist of three main components (e.g., a channel connector, a dialog orchestrator, and a dialog engine; not shown). The dialog engine (which may be a generic Network Diagnostics Framework (NDF) application) may be designed to follow the details of the nodes within the design tooling, which may make reading and following the code, trace logging, breadcrumb logging, and design much easier and may require little effort to debug the issues that often occur during development. Each state used in the dialog design view may be referenceable in the runtime configuration/code. As each node is executed, the runtime may log user behaviors in a log file for subsequent reporting and optimization.

Report Data

Report data 104 is generated by the dialog runtime (i.e., DLGaaS 114) of conversational application development process 10, wherein report data 104 may be used within the reports generated by conversational application development process 10. The data (e.g., report data 104) created by the dialog runtime (i.e., DLGaaS 114) may mimic the structure of the original design to enable the user of conversational application development process 10 to more easily see what is happening within their design. For example, each node in the design may have built in events (or breadcrumbs) that explain what the user (or runtime) did based upon the user responses and/or data coming from the backend systems. This data may then imported into reporting tool 106 of conversational application development process 10.

Reporting and Optimization

Reporting tool 106 of conversational application development process 10 may enable the generation of reports based upon the data (e.g., report data 104) created by the dialog runtime (i.e., DLGaaS 114). Because the runtime logging (by e.g., DLGaaS 114) may be tied directly to the design of the conversational application (e.g., conversational application 56), user behaviors may be easy to visualize. For example, reporting tool 106 may provide a clear view of: how many users are accessing each intent and node; recognition/interpretation performance at each node; levels of automation within each intent; and areas causing errors or misunderstandings. Accordingly, users of conversational application development process 10 may quickly pinpoint areas of the conversational application (e.g., conversational application 56) that require optimization, which may be accomplished through adjustments to language models and/or dialogs.

Mix.test

Mix-test 108 of conversational application development process 10 may enable the user to effectuate testing of the conversational application (e.g., conversational application 56). In order to ensure that end users are receiving the desired experience, Mix-test 108 of conversational application development process 10 may enable users to perform a thorough regression test of the conversational application (e.g., conversational application 56). As is known in the art, regression testing is typically a laborious, time-consuming process that requires a trade-off between getting an application release out the door in time and risking a poor user experience/costly bugs in production.

Mix-test 108 of conversational application development process 10 may remove the need for compromise by automating the testing process. For example, users of conversational application development process 10 may rapidly create a regression test set by clicking through the paths in their design flow. Further and as the test cases may be tied directly to the design, users of conversational application development process 10 may view the areas of the design that have been tested by such regression test sets, as well as those areas of the design that still require testing, as well as those areas of the design that retesting following a design change.

Test cases may be executed in a variety of ways, such as a) manually (via JUnit to make sure that design, code, logging, and reporting are aligned); and b) automatically through an automation vendor like Empirix or Cyara. As could be expected, automated testing may drastically reduce the time between releases, increasing speed and allowing more focus on enhancement and optimization of the user experience.

Figure 4:
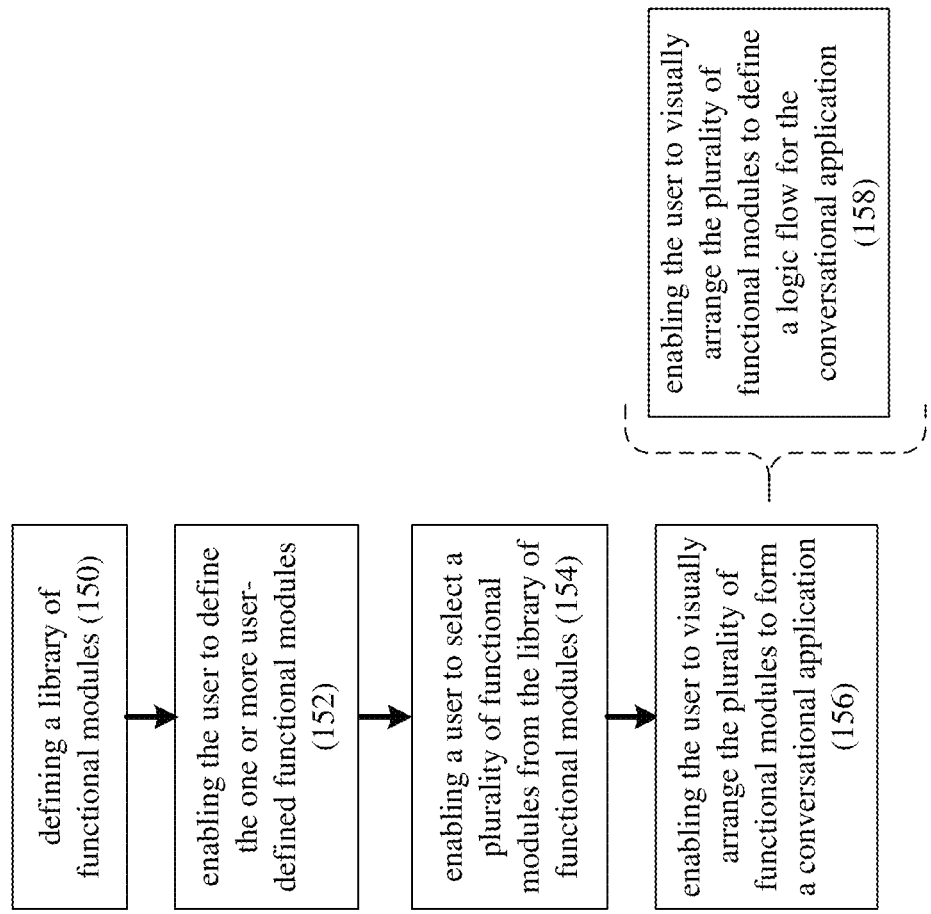
FIG. 4 is a flow chart of an implementation of the conversational application development process of FIG. 1 according to an embodiment of the present disclosure.

A Visual Multi-Channel/Multi-Modality/Multi-Language Development Platform:

Referring also to FIG. 4, conversational application development process 10 may define 150 a library of functional modules (e.g., library of functional modules 118).

The library of functional modules (e.g., library of functional modules 118) may include: one or more predefined functional modules (e.g., predefined functional modules 120); and one or more user-defined functional modules (e.g., user-defined functional modules 122).

When conversational application development process 10 allows for use of user-defined functional modules (e.g., user-defined functional modules 122), conversational application development process 10 may enable 152 a user (e.g., user 42) to define the one or more user-defined functional modules (e.g., user-defined functional modules 122).

Each of the functional modules included within library of functional modules 118 may be "building blocks" with which the conversational application (e.g., conversational application 56) may be designed. For example, each of the functional modules included within library of functional modules 118 may be blocks of code that effectuates a logical function, wherein examples of such logical function may include but is not limited to: a controller function, a decision function, a play prompt function, a dialog module function, a data access function, an intent function, a concept function, a value function, a sentence function, and various user-defined functions. Each of the functional modules included within library of functional modules 118 may include one or more inputs and/or one or more outputs, wherein e.g., the output(s) of one functional module may be coupleable to the input(s) of other functional modules.

Accordingly, conversational application development process 10 may enable 154 the user (e.g., user 42) to select a plurality of functional modules (e.g., plurality of functional modules 124) from the library of functional modules (e.g., library of functional modules 118) and may enable 156 the user (e.g., user 42) to visually arrange the plurality of functional modules (e.g., plurality of functional modules 124) to form a conversational application (e.g., conversational application 56).

Specifically and when enabling 156 the user (e.g., user 42) to visually arrange the plurality of functional modules (e.g., plurality of functional modules 124) to form a conversational application (e.g., conversational application 56), conversational application development process 10 may enable 158 the user (e.g., user 42) to visually arrange the plurality of functional modules (e.g., plurality of functional modules 124) to define a logic flow (e.g., logic flow 126) for the conversational application (e.g., conversational application 56).

Figure 5:
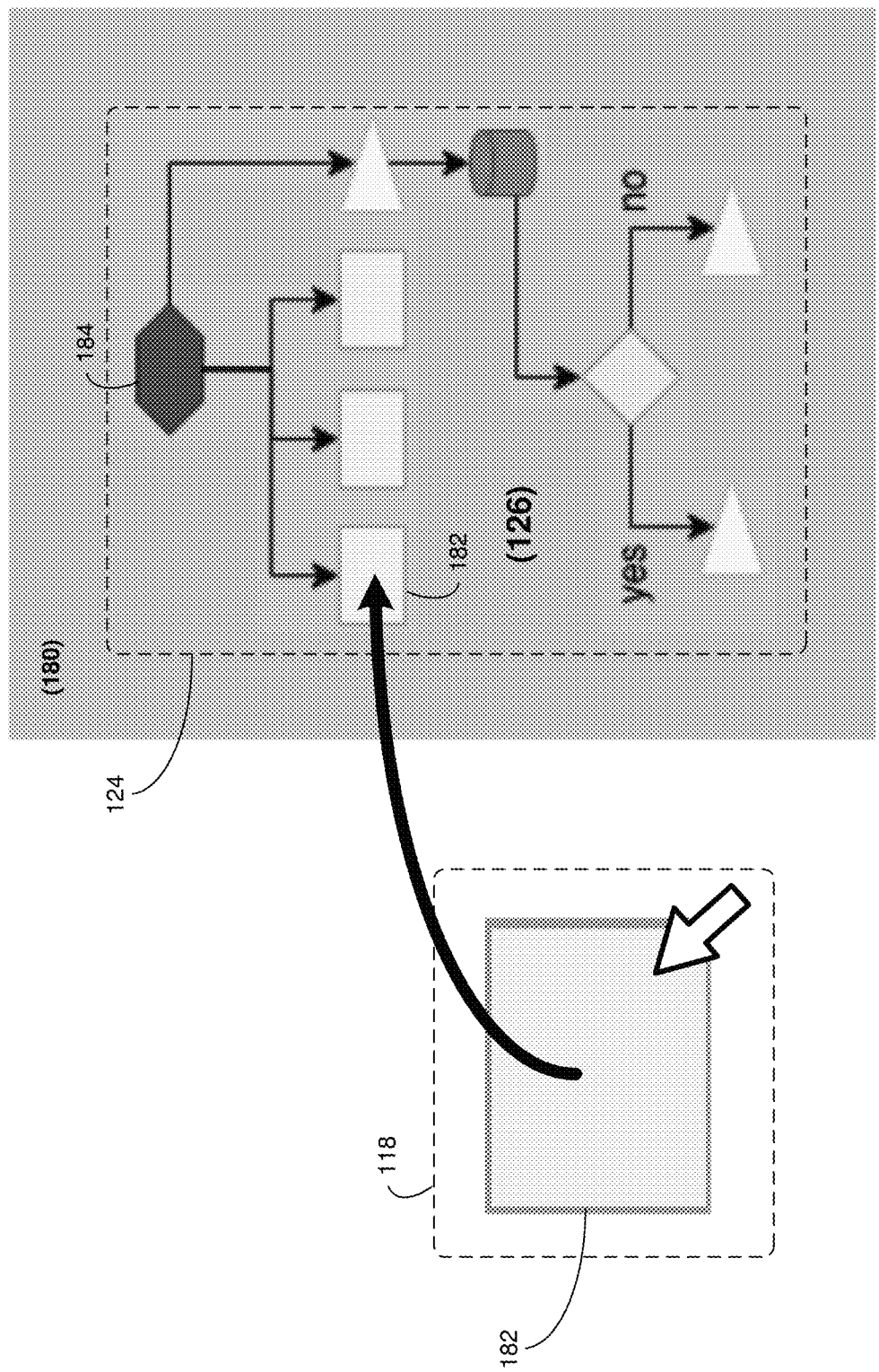
FIG. 5 is a diagrammatic view of a design space generated by the conversational application development process of FIG. 1 according to an embodiment of the present disclosure.

For example and referring also to FIG. 5, the user (e.g., user 42) may drag-and-drop functional modules (e.g., predefined functional modules 120 and/or user-defined functional modules 122) from library of functional modules 118 to design space 180 of conversational application development process 10, wherein the user (e.g., user 42) may visually arrange the plurality of functional modules (e.g., plurality of functional modules 124) to define a logic flow (e.g., logic flow 126) for the conversational application (e.g., conversational application 56).

As discussed above, each of the functional modules included within library of functional modules 118 may include one or more inputs and/or one or more outputs, wherein e.g., the output(s) of one functional module may be coupleable to the input(s) of other functional modules. Accordingly and when visually arranging the plurality of functional modules (e.g., plurality of functional modules 124) to define a logic flow (e.g., logic flow 126) for the conversational application (e.g., conversational application 56), the user (e.g., user 42) may couple the outputs of some functional modules within logic flow 126 to the inputs of other functional modules within logic flow 126. For example and when adding functional module 182 to logic flow 126, the user (e.g., user 42) may couple one or the outputs of functional module 184 to the input of functional module 182.

The conversational application (e.g., conversational application 56) may include one or more of: a multi-channel conversational application; and a multi-modality conversational application. A multi-channel conversational application (e.g., conversational application 56) may include two or more channels (e.g., two or more of IVR channel 58, SMS channel 60, Mobile-Based Channel 62, Web-Based Channel 64). Examples of a multi-modality conversational application (e.g., conversational application 56) may include any conversational application that is configured to (and capable of) communicating with an end user (e.g., end user 38) in a variety of communication modalities. Examples of such communication modalities may include but are not limited to one or more of: an audio-based communication modality (e.g., utilizing recorded audio segment functionality and/or utilizing text-to-speech functionality); and a visual-based communication modality (e.g., utilizing JSON text-based functionality and/or utilizing HTML/SSML text-based functionality).

As is known in the art, JavaScript Object Notation (JSON) is an open standard file format, and data interchange format, that uses human-readable text to store and transmit data objects consisting of attribute-value pairs and array data types (or any other serializable value). JSON is a common data format, with a diverse range of applications, such as serving as a replacement for XML in AJAX systems.

As is known in the art, Hypertext Markup Language (HTML) is the standard markup language for documents designed to be displayed in a web browser. HTML may be assisted by technologies such as Cascading Style Sheets (CSS) and scripting languages such as JavaScript. Web browsers may receive HTML documents from a web server or from local storage and may render the documents into multimedia web pages. HTML may describe the structure of a web page semantically.

As is known in the art, Speech Synthesis Markup Language (SSML) is an XML-based markup language for speech synthesis applications. It is a recommendation of the W3C's voice browser working group. SSML is often embedded in VoiceXML scripts to drive interactive telephony systems. However, it also may be used alone, such as for creating audio books.

Figure 6:
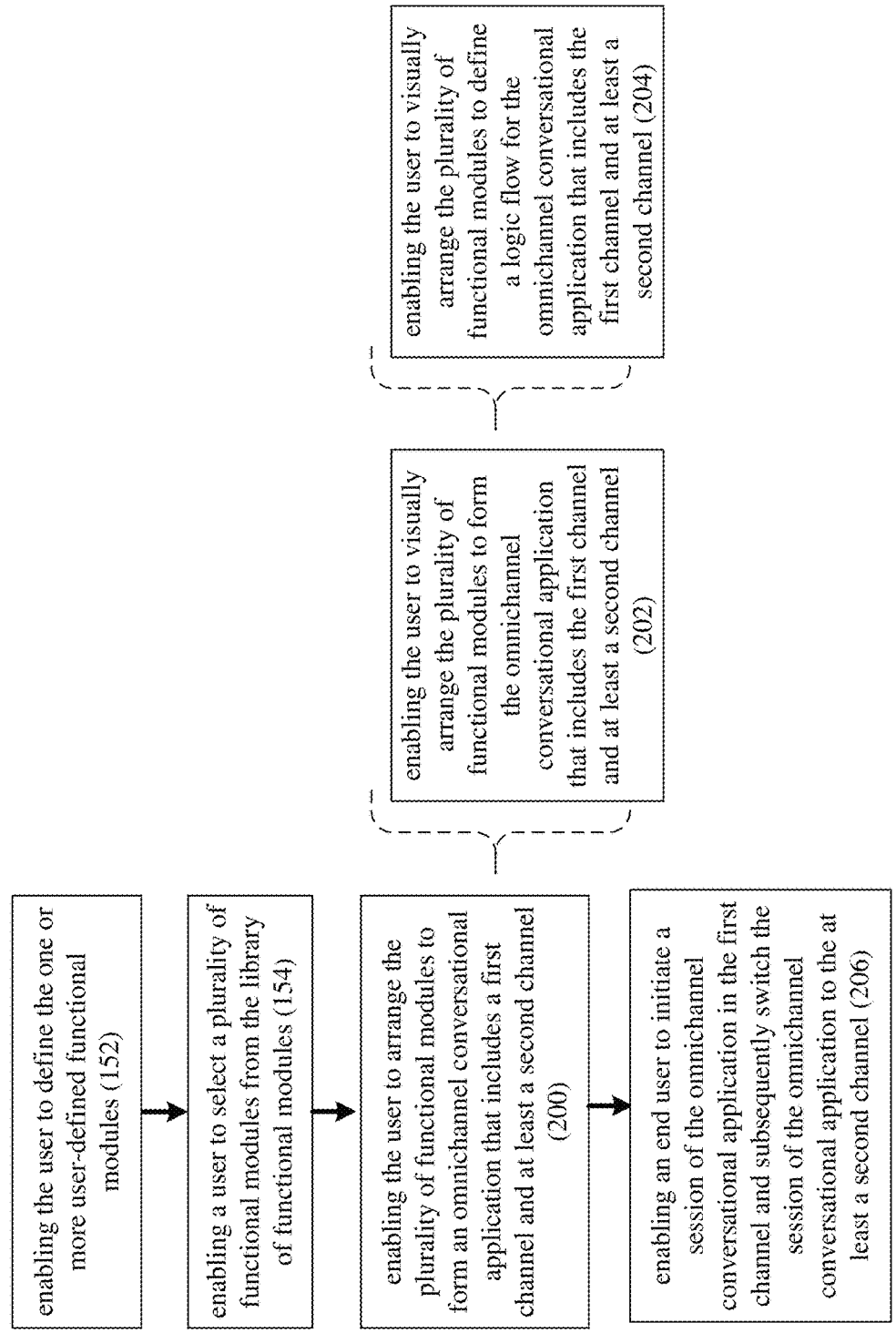
FIG. 6 is a flow chart of another implementation of the conversational application development process of FIG. 1 according to an embodiment of the present disclosure.

An Omni-Channel Development Platform:

Referring also to FIG. 6 and as discussed above, the library of functional modules (e.g., library of functional modules 118) may include one or more predefined functional modules (e.g., predefined functional modules 120) and one or more user-defined functional modules (e.g., user-defined functional modules 122); wherein conversational application development process 10 may enable 152 the user (e.g., user 42) to define the one or more user-defined functional modules (e.g., user-defined functional modules 122).

As discussed above, conversational application development process 10 may enable 154 the user (e.g., user 42) to select a plurality of functional modules (e.g., plurality of functional modules 124) from the library of functional modules (e.g., library of functional modules 118).

Conversational application development process 10 may enable 200 the user (e.g., user 42) to arrange the plurality of functional modules (e.g., plurality of functional modules 124) to form an omnichannel conversational application (e.g., conversational application 56) that includes a first channel and at least a second channel. An omnichannel conversational application (e.g., conversational application 56) is a conversational application that is configured to enable an end user (e.g., end user 36) to begin a session of conversational application 56 in the first channel and transition the session to at least a second channel without having to restart the session. For example, the first channel and at least a second channel may include two or more of: IVR channel 58, SMS channel 60, Mobile-Based Channel 62, Web-Based Channel 64.

The omnichannel conversational application (e.g., conversational application 56) may include one or more of: an audio-based communication modality (e.g., utilizing recorded audio segment functionality and/or utilizing text-to-speech functionality); and a visual-based communication modality (e.g., utilizing JSON text-based functionality and/or utilizing HTML/SSML text-based functionality).

When enabling 200 the user (e.g., user 42) to arrange the plurality of functional modules (e.g., plurality of functional modules 124) to form an omnichannel conversational application (e.g., conversational application 56) that includes a first channel and at least a second channel, conversational application development process 10 may enable 202 the user (e.g., user 42) to visually arrange the plurality of functional modules (e.g., plurality of functional modules 124) to form the omnichannel conversational application (e.g., conversational application 56) that includes the first channel and at least a second channel.

Specifically and when enabling 202 the user (e.g., user 42) to visually arrange the plurality of functional modules (e.g., plurality of functional modules 124) to form the omnichannel conversational application (e.g., conversational application 56) that includes the first channel and at least a second channel, conversational application development process 10 may enable 204 the user (e.g., user 42) to visually arrange the plurality of functional modules (e.g., plurality of functional modules 124) to define a logic flow (e.g., logic flow 126) for the omnichannel conversational application (e.g., conversational application 56) that includes the first channel and at least a second channel.

As discussed above, the user (e.g., user 42) may drag-and-drop functional modules (e.g., predefined functional modules 120 and/or user-defined functional modules 122) from library of functional modules 118 to design space 180 of conversational application development process 10, wherein the user (e.g., user 42) may visually arrange the plurality of functional modules (e.g., plurality of functional modules 124) to define a logic flow (e.g., logic flow 126) for the conversational application (e.g., conversational application 56).

Conversational application development process 10 may enable 206 an end user (e.g., end user 36) to initiate a session of the omnichannel conversational application (e.g., conversational application 56) in the first channel and subsequently switch the session of the omnichannel conversational application (e.g., conversational application 56) to the at least a second channel.

For example, assume that user 36 is having a problem with their credit card and needs to contact their credit card company. Accordingly, conversational application development process 10 may enable 206 end user 36 to initiate a session of the omnichannel conversational application (e.g., conversational application 56) in the first channel (e.g., IVR channel 58). For example, assume that user 36 uses IVR channel 58 to initiate a session and successfully provide their identity, provide their credit card number, and identify the general issue that needs to be addressed (e.g., an incorrect purchase amount on a specific charge). However, assume that after entering all of this information, IVR channel 58 of conversational application 56 is having difficulty understanding the date of the specific charge (as user 36 is inadvertently entering the purchase date in an incorrect format). As conversational application development process 10 may enable 206 user 36 to switch the session of the omnichannel conversational application (e.g., conversational application 56) to another channel, user 36 may continue their session using a different channel without having to restart the session (or reenter the information already provided to conversational application development process 10). For example, user 36 may request (via IVR channel 58) that conversational application development process 10 continue the session via SMS channel 60 by saying e.g., "Please text me @987-654-3210". Conversational application development process 10 may then utilize SMS channel 60 to continue the previously-started session via text messages to 987-654-3210.

Figure 7:
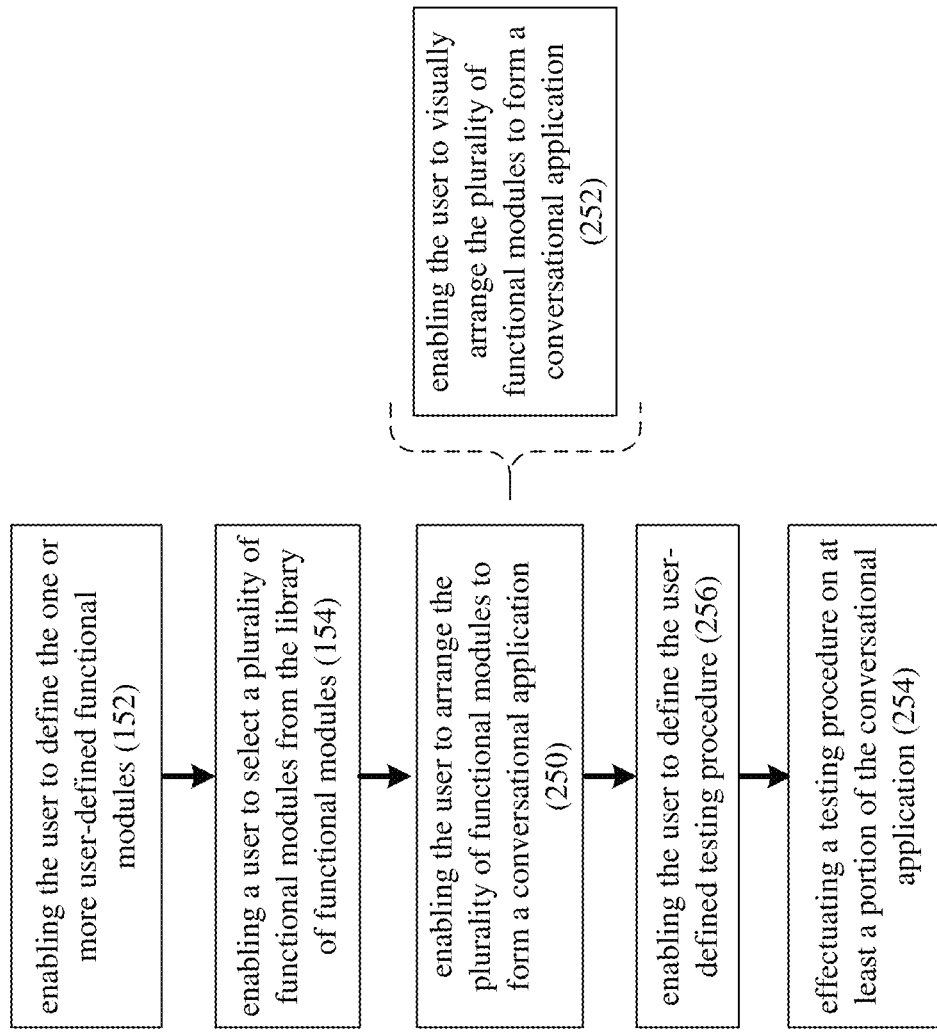
FIG. 7 is a flow chart of another implementation of the conversational application development process of FIG. 1 according to an embodiment of the present disclosure.

A Conversational Al Test Platform:

Referring also to FIG. 7 and as discussed above, the library of functional modules (e.g., library of functional modules 118) may include one or more predefined functional modules (e.g., predefined functional modules 120) and one or more user-defined functional modules (e.g., user-defined functional modules 122); wherein conversational application development process 10 may enable 152 the user (e.g., user 42) to define the one or more user-defined functional modules (e.g., user-defined functional modules 122).

Further and as discussed above, conversational application development process 10 may enable 154 the user (e.g., user 42) to select a plurality of functional modules (e.g., plurality of functional modules 124) from a library of functional modules (e.g., library of functional modules 118).

Conversational application development process 10 may enable 250 the user (e.g., user 42) to arrange the plurality of functional modules (e.g., plurality of functional modules 124) to form a conversational application (e.g., conversational application 56).

As discussed above, the conversational application (e.g., conversational application 56) may include one or more of: a multi-channel conversational application; and a multi-modality conversational application. A multi-channel conversational application (e.g., conversational application 56) may include two or more channels (e.g., two or more of IVR channel 58, SMS channel 60, Mobile-Based Channel 62, Web-Based Channel 64). Examples of a multi-modality conversational application (e.g., conversational application 56) may include any conversational application that is configured to (and capable of) communicating with an end user (e.g., end user 38) in a variety of communication modalities. Examples of such communication modalities may include but are not limited to one or more of: an audio-based communication modality (e.g., utilizing recorded audio segment functionality and/or utilizing text-to-speech functionality); and a visual-based communication modality (e.g., utilizing JSON text-based functionality and/or utilizing HTML/SSML text-based functionality).

Specifically and when enabling 250 the user (e.g., user 42) to arrange the plurality of functional modules (e.g., plurality of functional modules 124) to form a conversational application (e.g., conversational application 56), conversational application development process 10 may enable 252 the user (e.g., user 42) to visually arrange the plurality of functional modules (e.g., plurality of functional modules 124) to form a conversational application (e.g., conversational application 56).

As discussed above, the user (e.g., user 42) may drag-and-drop functional modules (e.g., predefined functional modules 120 and/or user-defined functional modules 122) from library of functional modules 118 to design space 180 of conversational application development process 10, wherein the user (e.g., user 42) may visually arrange the plurality of functional modules (e.g., plurality of functional modules 124) to define a logic flow (e.g., logic flow 126) for the conversational application (e.g., conversational application 56).

Conversational application development process 10 may effectuate 254 a testing procedure (e.g., testing procedure 66) on at least a portion of the conversational application (e.g., conversational application 56). An example of the testing procedure (e.g., testing procedure 66) may include (as discussed above) a regression test. As is known in the art, regression testing is typically a laborious, time-consuming process that requires a trade-off between getting an application release out the door in time and risking a poor user experience/costly bugs in production. However, being that conversational application development process 10 automates this testing procedure (e.g., testing procedure 66), the process of performing such testing is greatly streamlined.

The testing procedure (e.g., testing procedure 66) may be a predefined testing procedure or a user-defined testing procedure, wherein conversational application development process 10 may enable 256 the user (e.g., user 42) to define such user-defined testing procedures.

Figure 8:
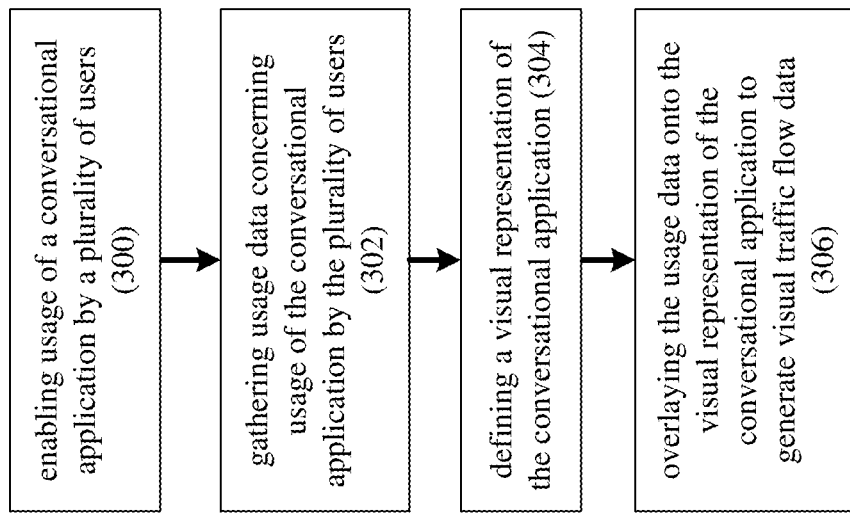
FIG. 8 is a flow chart of another implementation of the conversational application development process of FIG. 1 according to an embodiment of the present disclosure.

Visual Reporting System:

Referring also to FIG. 8, once the conversational application (e.g., conversational application 56) is developed and tested (in the manner described above) using conversational application development process 10, conversational application development process 10 may enable 300 usage of the conversational application (e.g., conversational application 56) by a plurality of users (e.g., users, 36, 38, 40). This plurality of users (e.g., users, 36, 38, 40) may include one or more end users (e.g., customers & users of conversational application 56) and/or one or more testers (e.g., alpha testers & beta testers of conversational application 56).

As discussed above, the conversational application (e.g., conversational application 56) may be defined using a plurality of functional modules (e.g., plurality of functional modules 124). This plurality of functional modules (e.g., plurality of functional modules 124) may include: one or more predefined functional modules (e.g., predefined functional modules 120); and one or more user-defined functional modules (e.g., user-defined functional modules 122).

As discussed above, the conversational application (e.g., conversational application 56) may include one or more of: a multi-channel conversational application; and a multi-modality conversational application. A multi-channel conversational application (e.g., conversational application 56) may include two or more channels (e.g., two or more of IVR channel 58, SMS channel 60, Mobile-Based Channel 62, Web-Based Channel 64). As discussed above, examples of a multi-modality conversational application (e.g., conversational application 56) may include any conversational application that is configured to (and capable of) communicating with an end user (e.g., end user 38) in a variety of communication modalities. As further discussed above, examples of such communication modalities may include but are not limited to one or more of: an audio-based communication modality (e.g., utilizing recorded audio segment functionality and/or utilizing text-to-speech functionality); and a visual-based communication modality (e.g., utilizing JSON text-based functionality and/or utilizing HTML/SSML text-based functionality).

Figure 9:
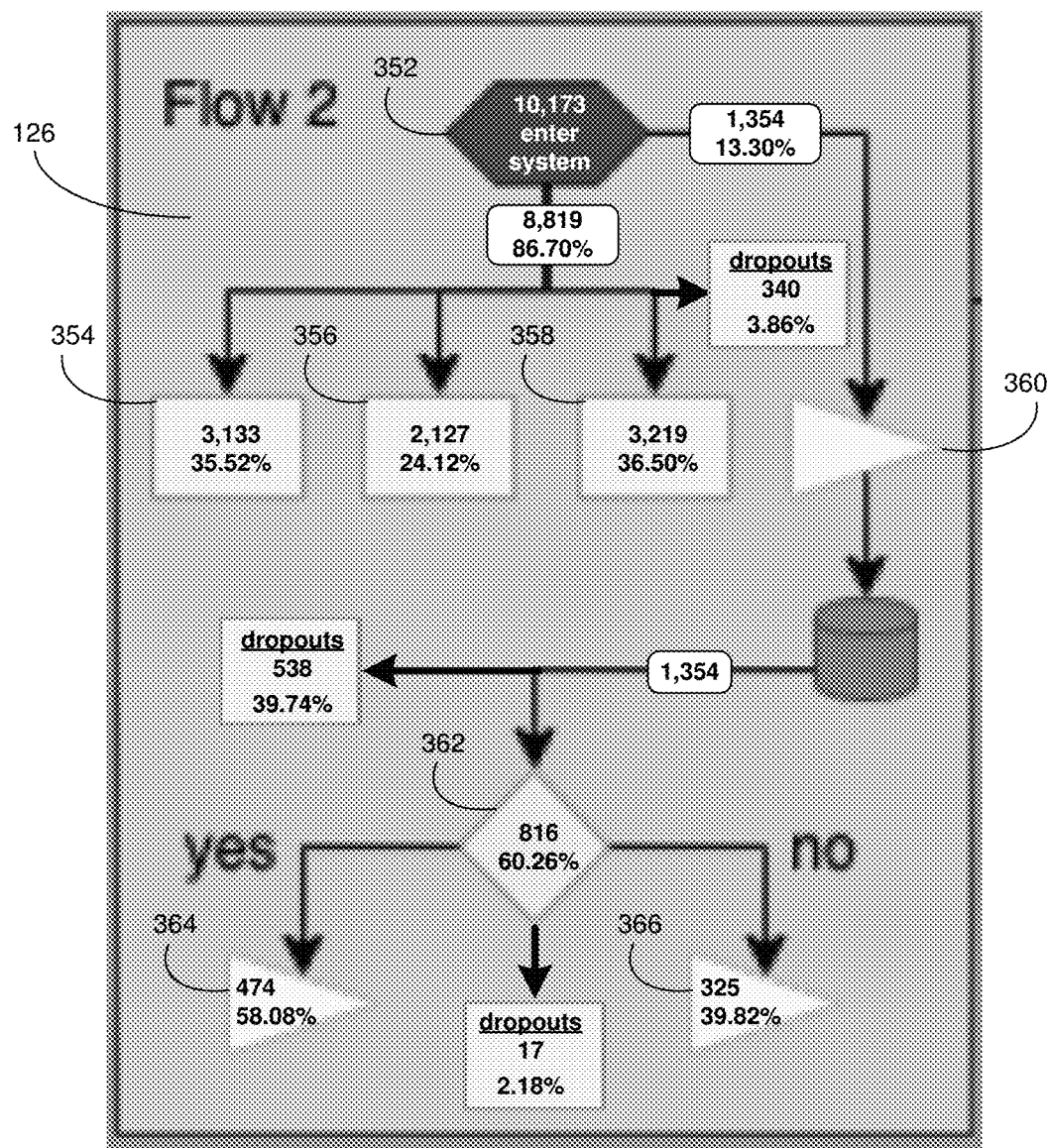
FIG. 9 is a diagrammatic view of visual traffic flow data generated by the conversational application development process of FIG. 1 according to an embodiment of the present disclosure.

Referring also to FIG. 9, conversational application development process 10 may gather 302 usage data (e.g., report data 104) concerning usage of the conversational application (e.g., conversational application 56) by the plurality of users (e.g., users, 36, 38, 40). Conversational application development process 10 may then define 304 a visual representation of the conversational application (e.g., conversational application 56), wherein this visual representation of the conversational application (e.g., conversational application 56) may be a logic flow (e.g., logic flow 126) of the conversational application (e.g., conversational application 56).

Conversational application development process 10 may overlay 306 the usage data (e.g., report data 104) onto the visual representation (e.g., logic flow 126) of the conversational application (e.g., conversational application 56) to generate visual traffic flow data 350.

Visual traffic flow data 350 may be configured to define one or more of:
- a flow of the plurality of users (e.g., users, 36, 38, 40) through the visual representation of the conversational application (e.g., conversational application 56), thus allowing user 42 to monitor user flow through conversational application 56;
- a quantity of users entering one or more of the plurality of functional modules, thus allowing user 42 to monitor the inbound loading of individual nodes within conversational application 56;
- a percentage of users entering one or more of the plurality of functional modules, thus allowing user 42 to monitor the inbound load balancing of individual nodes within conversational application 56;
- a quantity of users leaving one or more of the plurality of functional modules, thus allowing user 42 to monitor the outbound loading of individual nodes within conversational application 56;
- a percentage of users leaving one or more of the plurality of functional modules, thus allowing user 42 to monitor the outbound load balancing of individual nodes within conversational application 56;

a quantity of users leaving the conversational application (e.g., conversational application 56), thus allowing user 42 to monitor the dropout numbers at various locations within conversational application 56; and a percentage of users leaving the conversational application (e.g., conversational application 56), thus allowing user 42 to monitor the dropout percentage at various locations within conversational application 56.

When conversational application development process 10 overlays 306 the usage data (e.g., report data 104) onto the visual representation (e.g., logic flow 126) of the conversational application (e.g., conversational application 56) to generate visual traffic flow data 350, visual traffic flow data 350 may define the following:

10,173 users initiated a session with conversational application 56 at controller node 352, wherein:
  8,819 users of these 10,173 users (86.70%) navigated toward dialog nodes 354, 356, 358; and
  1,354 users of these 10,173 users (13.30%) navigated toward play prompt node 360.
Of the 8,819 users that navigated toward dialog nodes 354, 356, 358:
  3,133 users of these 8,819 users (35.52%) navigated toward dialog node 354;
  2,127 users of these 8,819 users (24.12%) navigated toward dialog node 356;
  3,219 users of these 8,819 users (36.50%) navigated toward dialog node 358; and
  340 users of these 8,819 users (3.86%) dropped out of conversational application 56 (e.g., hung up the phone, ended the chat session or closed the application).
Of the 1,354 users that navigated toward play prompt node 360:
  816 users of these 1,354 users (60.26%) navigated toward decision node 362; and
  538 users of these 1,354 users (39.74%) dropped out of conversational application 56 (e.g., hung up the phone, ended the chat session or closed the application).
Of the 816 users that navigated toward decision node 362:
  474 users of these 816 users (58.08%) navigated toward play prompt node 364;
  325 users of these 816 users (39.82%) navigated toward play prompt node 366; and
  17 users of these 816 users (2.18%) dropped out of conversational application 56 (e.g., hung up the phone, ended the chat session or closed the application).

Figure 10:
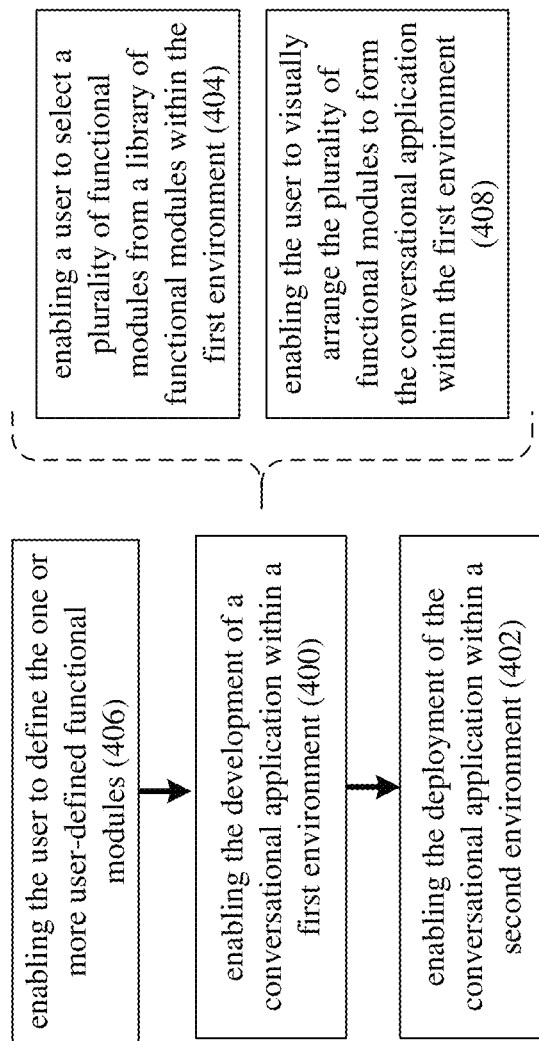
FIG. 10 is a flow chart of another implementation of the conversational application development process of FIG. 1 according to an embodiment of the present disclosure.

Hybrid Cloud:

Referring also to FIG. 10 and as discussed above, conversational application development process 10 may enable 400 the development of a conversational application (e.g., conversational application 56) within a first environment and may enable 402 the deployment of the conversational application (e.g., conversational application 56) within a second environment.

For example, the first environment may be a cloud environment and the second environment may be a local environment. Alternatively, the first environment may be a local environment and the second environment may be a cloud environment.

For the following discussion, a cloud environment may include an environment for remotely executing conversational application development process 10. As is known in the art, a cloud environment is on-demand remote computer resources, such as remote data storage (e.g., cloud storage; not shown) and remote computing power (e.g., compute resources; not shown) without any direct active management by the user (e.g., user 42). The term cloud environment is generally used to describe data centers available to many users over the Internet. Large cloud environments often have functions that are distributed over multiple locations from central servers. Cloud environments may be limited to a single organization (enterprise clouds) or may be available to many organizations (public cloud).

One example of such a cloud environment (be it the first environment or the second environment) may be an SaaS environment (e.g., SaaS environment 68). As is known in the art, Software as a service (SaaS) is a software licensing and delivery model in which software is licensed on a subscription basis and is centrally hosted. SaaS applications may be known as web-based software, on-demand software and hosted software. The term "software as a service" (SaaS) is considered to be part of the nomenclature of cloud computing, along with Infrastructure as a Service (IaaS), Platform as a Service (PaaS), Desktop as a Service (DaaS), Managed Software as a Service (MSaaS), Mobile Backend as a Service (MBaaS), Datacenter as a Service (DCaaS), and Information Technology Management as a Service (ITMaaS). SaaS applications may be accessed by a user (e.g., user 42) using a thin client (e.g. via a web browser).

For the following discussion, a local environment may include an environment for locally executing conversational application development process 10, wherein this local environment may include local data storage (e.g., storage device 16) and local computing power (e.g., computing device 12) that is actively managed by the user (e.g., user 42).

When enabling 400 the development of a conversational application (e.g., conversational application 56) within a first environment, conversational application development process 10 may enable 404 a user (e.g., user 42) to select a plurality of functional modules (e.g., plurality of functional modules 124) from a library of functional modules (e.g., library of functional modules 118) within the first environment.

The library of functional modules (e.g., library of functional modules 118) may include: one or more predefined functional modules (e.g., predefined functional modules 120); and one or more user-defined functional modules (e.g., user-defined functional modules 122), wherein conversational application development process 10 may enable 406 the user (e.g., user 42) to define the one or more user-defined functional modules (e.g., user-defined functional modules 122).

Additionally and when enabling 400 the development of a conversational application (e.g., conversational application 56) within a first environment, conversational application development process 10 may enable 408 the user (e.g., user 42) to visually arrange the plurality of functional modules (e.g., plurality of functional modules 124) to form the conversational application (e.g., conversational application 56) within the first environment.

As discussed above, the user (e.g., user 42) may drag-and-drop functional modules (e.g., predefined functional modules 120 and/or user-defined functional modules 122) from library of functional modules 118 to design space 180 of conversational application development process 10, wherein the user (e.g., user 42) may visually arrange the plurality of functional modules (e.g., plurality of functional modules 124) to define a logic flow (e.g., logic flow 126) for the conversational application (e.g., conversational application 56).

As discussed above, the conversational application (e.g., conversational application 56) may include one or more of: a multi-channel conversational application; and a multi-modality conversational application. A multi-channel conversational application (e.g., conversational application 56) may include two or more channels (e.g., two or more of IVR channel 58, SMS channel 60, Mobile-Based Channel 62, Web-Based Channel 64). As discussed above, examples of a multi-modality conversational application (e.g., conversational application 56) may include any conversational application that is configured to (and capable of) communicating with an end user (e.g., end user 38) in a variety of communication modalities. As further discussed above, examples of such communication modalities may include but are not limited to one or more of: an audio-based communication modality (e.g., utilizing recorded audio segment functionality and/or utilizing text-to-speech functionality); and a visual-based communication modality (e.g., utilizing JSON text-based functionality and/or utilizing HTML/SSML text-based functionality).

Through the use of the system described above, conversational application development process 10 may allow for various design/deployment strategies with respect to conversational application 56, examples of which may include but are not limited to:
- conversational application 56 being developed on a local environment, tested on a cloud environment, and deployed on a local environment;
- conversational application 56 being developed on a cloud environment, tested on a cloud environment, and deployed on a local environment;
- conversational application 56 being developed on a local environment, tested on a local environment, and deployed on a cloud environment; and
- conversational application 56 being developed on a cloud environment, tested on a local environment, and deployed on a cloud environment.

Figure 11:
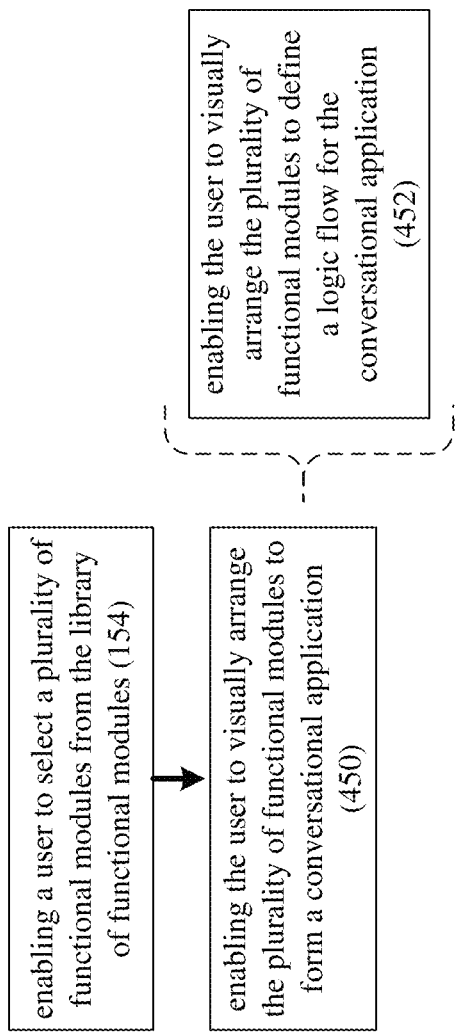
FIG. 11 is a flow chart of another implementation of the conversational application development process of FIG. 1 according to an embodiment of the present disclosure.

Business Roadmap:

Referring also to FIG. 11 and as discussed above, conversational application development process 10 may enable 154 the user (e.g., user 42) to select a plurality of functional modules (e.g., plurality of functional modules 124) from a library of functional modules (e.g., library of functional modules 118). This library of functional modules (e.g., library of functional modules 118) may include one or more predefined functional modules (e.g., predefined functional modules 120) and one or more user-defined functional modules (e.g., user-defined functional modules 122).

As also discussed above, conversational application development process 10 may enable 450 the user (e.g., user 42) to visually arrange the plurality of functional modules (e.g., plurality of functional modules 124) to form a conversational application (e.g., conversational application 56). For example, the user (e.g., user 42) may drag-and-drop functional modules (e.g., predefined functional modules 120 and/or user-defined functional modules 122) from library of functional modules 118 to design space 180 of conversational application development process 10.

Conversational application development process 10 may be configured to enable the user (e.g., user 42) to define a contingency plan (e.g., contingency plan 70) within the conversational application (e.g., conversational application 56). Specifically, the conversational application (e.g., conversational application 56) may include a contingency platform (e.g., contingency platform 72) configured to enable an administrator (e.g., user 42) of the conversational application (e.g., conversational application 56) to activate the contingency plan (e.g., contingency plan 70) at some point-in-time after the deployment of the conversational application (e.g., conversational application 56). As will be discussed below in greater detail, this contingency plan (e.g., contingency plan 70) may be configured to be activated during atypical situations.

When enabling 450 the user (e.g., user 42) to visually arrange the plurality of functional modules (e.g., plurality of functional modules 124) to form a conversational application (e.g., conversational application 56), conversational application development process 10 may enable 452 the user (e.g., user 42) to visually arrange the plurality of functional modules (e.g., plurality of functional modules 124) to define a logic flow (e.g., logic flow 126) for the conversational application (e.g., conversational application 56).

As discussed above, the conversational application (e.g., conversational application 56) may include one or more of: a multi-channel conversational application; and a multi-modality conversational application. A multi-channel conversational application (e.g., conversational application 56) may include two or more channels (e.g., two or more of IVR channel 58, SMS channel 60, Mobile-Based Channel 62, Web-Based Channel 64). As discussed above, examples of a multi-modality conversational application (e.g., conversational application 56) may include any conversational application that is configured to (and capable of) communicating with an end user (e.g., end user 38) in a variety of communication modalities. As further discussed above, examples of such communication modalities may include but are not limited to one or more of: an audio-based communication modality (e.g., utilizing recorded audio segment functionality and/or utilizing text-to-speech functionality); and a visual-based communication modality (e.g., utilizing JSON text-based functionality and/or utilizing HTML/SSML text-based functionality).

As will be discussed below in further detail, when activating the contingency plan (e.g., contingency plan 70), the logic flow (e.g., logic flow 126) for the conversational application (e.g., conversational application 56) may be revised.

The contingency platform (e.g., contingency platform 72) may be further configured to enable the administrator (e.g., user 42) of the conversational application (e.g., conversational application 56) to deactivate the contingency plan (e.g., contingency plan 70), wherein deactivating the contingency plan (e.g., contingency plan 70) may restore the logic flow (e.g., logic flow 126) for the conversational application (e.g., conversational application 56).

For example, assume that the conversational application (e.g., conversational application 56) includes a logic flow (e.g., logic flow 126) that includes channels (e.g., IVR channel 58, SMS channel 60, Mobile-Based Channel 62, Web-Based Channel 64) that enable end users to blook air travel and check that status of flights. Further and for this example, assume that the conversational application (e.g., conversational application 56) is currently deployed and fully operational. Further assume that the Chicago area (including O'Hare Airport and Midway Airport) are experiencing blizzard conditions, thus temporarily shutting down all air travel into and out of these two airports.

As discussed above, conversational application 56 may include a contingency platform (e.g., contingency platform 72) configured to enable an administrator (e.g., user 42) of the conversational application (e.g., conversational application 56) to activate a contingency plan (e.g., contingency plan 70) at some point-in-time after the deployment of the conversational application (e.g., conversational application 56). Accordingly, an administrator (e.g., user 42) of the conversational application (e.g., conversational application 56) may choose to activate contingency plan 70 to notify users of the conditions are O'Hare and Midway Airports.

Accordingly, an administrator (e.g., user 42) of conversational application 56 may utilize contingency platform 72 to define the appropriate messages that may be provided to end users via the appropriate channels (e.g., IVR channel 58, SMS channel 60, Mobile-Based Channel 62, Web-Based Channel 64). The administrator (e.g., user 42) of conversational application 56 may then activate contingency plan 70. Once activated, end users of conversational application 56 seeking information of flights into or out of O'Hare Airport and/or Midway Airport may be notified that all such flights have been cancelled/diverted.

As discussed above, when activating the contingency plan (e.g., contingency plan 70), the logic flow (e.g., logic flow 126) for the conversational application (e.g., conversational application 56) may be revised. For example, any paths within logic flow 126 that are pointing toward nodes that concern the status of outbound flights from O'Hare Airport and/or Midway Airport may be redirected to a dialog module that states "Due to the weather conditions at O'Hare Airport and Midway Airport, all outbound flights from O'Hare Airport and Midway Airport are cancelled until further notice." Further, any paths within logic flow 126 that are pointing toward nodes that concern the status of inbound flights to O'Hare Airport and/or Midway Airport may be redirected to a dialog module that states "Due to the weather conditions at O'Hare Airport and Midway Airport, all inbound flights to O'Hare Airport and Midway Airport are being redirected to General Mitchell International Airport in Milwaukee, WI."

As discussed above, when deactivating the contingency plan (e.g., contingency plan 70), the logic flow (e.g., logic flow 126) for the conversational application (e.g., conversational application 56) may be restored. For example, any paths within logic flow 126 that were pointing toward nodes that concern the status of outbound flights from O'Hare Airport and/or Midway Airport and are now pointing to a dialog module that states "Due to the weather conditions at O'Hare Airport and Midway Airport, all outbound flights from O'Hare Airport and Midway Airport are cancelled until further notice." will be redirected to their original nodes. Further, any paths within logic flow 126 that were pointing toward nodes that concern the status of inbound flights to O'Hare Airport and/or Midway Airport and are now pointing to a dialog module that states "Due to the weather conditions at O'Hare Airport and Midway Airport, all inbound flights to O'Hare Airport and Midway Airport are being redirected to General Mitchell International Airport in Milwaukee, WI." will be redirected to their original nodes.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
    enabling a user to select a plurality of functional modules from a library of functional modules;
    enabling the user to arrange the plurality of functional modules to form an omnichannel conversational application that includes a first channel and at least a second channel;
    enabling the user to initiate a session of the omnichannel conversational application in the first channel;
    switching subsequently the session of the omnichannel conversational application to the at least a second channel; and
    continuing the session of the omnichannel conversational application using the at least a second channel without restarting the session.

2. The computer-implemented method of claim 1 wherein the first channel and at least a second channel include two or more of: an interactive Voice Response (IVR) channel; a Short Message Service (SMS) channel; a mobile-based channel; and a web-based channel.

3. The computer-implemented method of claim 1 wherein the omnichannel conversational application includes one or more of:
    an audio-based communication modality; and
    a visual-based communication modality.

4. The computer-implemented method of claim 3 wherein the audio-based communication modality includes one or more of:
    recorded audio segment functionality; and
    text-to-speech functionality.

5. The computer-implemented method of claim 3 wherein the visual-based communication modality includes one or more of:
    JavaScript Object Notation (JSON) text-based functionality; and
    HyperText Markup Language (HTML)/Synthesis Markup Language (SSML) text-based functionality.

6. The computer-implemented method of claim 1 wherein the library of functional modules includes:
    one or more predefined functional modules; and
    one or more user-defined functional modules.

7. The computer-implemented method of claim 6 further comprising:
    enabling the user to define the one or more user-defined functional modules.

8. The computer-implemented method of claim 1 wherein enabling the user to arrange the plurality of functional modules to form the omnichannel conversational application that includes the first channel and at east a second channel includes: enabling the user to visually arrange the plurality of functional modules to form the omnichannel conversational application that includes the first channel and at least a second channel.

9. The computer-implemented method of claim 8 wherein enabling the user to visually arrange the plurality of functional modules to form the omnichannel conversational application that includes the first channel and at least a second channel includes:
    enabling the user to visually arrange the plurality of functional modules to define a logic flow for the omnichannel conversational application that includes the first channel and at least a second channel.

10. A computer program product residing on a non-transitory computer readable medium having a plurality of instructions stored thereon which, when executed by a processor, cause the processor to perform operations comprising:

enabling a user to select a plurality of functional modules from a library of functional modules;

enabling the user to arrange the plurality of functional modules to form an omnichannel conversational application that includes a first channel and at least a second channel;

enabling the user to initiate a session of the omnichannel conversational application in the first channel;

switching subsequently the session of the omnichannel conversational application to the at least a second channel; and continuing the session of the omnichannel conversational application using the at least a second channel without restarting the session.

11. The computer program product of claim 10 wherein the first channel and at least a second channel include two or more of: an Interactive Voice Response (IVR) channel; a Short Message Service (SMS) channel; a mobile-based channel; and a web-based channel.

12. The computer program product of claim 10 wherein the omnichannel conversational application includes one or more of:
an audio-based communication modality; and
a visual-based communication modality.

13. The computer program product of claim 12 wherein the audio-based communication modality includes one or more of:
recorded audio segment functionality; and
text-to-speech functionality.

14. The computer program product of claim 12 wherein the visual-based communication modality includes one or more of:
JavaScript Object Notation (JSON) text-based functionality; and
HyperText Markup Language (HTML)/Synthesis Markup Language (SSML) text-based functionality.

15. The computer program product of claim 10 wherein the library of functional modules includes:
one or more predefined functional modules; and
one or more user-defined functional modules.

16. The computer program product of claim 15 further comprising:
enabling the user to define the one or more user-defined functional modules.

17. The computer program product of claim 10 wherein enabling the user to arrange the plurality of functional modules to form the omnichannel conversational application that includes the first channel and at least a second channel includes: enabling the user to visually arrange the plurality of functional modules to form the omnichannel conversational application that includes the first channel and at least a second channel.

18. The computer program product of claim 17 wherein enabling the user to visually arrange the plurality of functional modules to form the omnichannel conversational application that includes the first channel and at least a second channel includes:
enabling the user to visually arrange the plurality of functional modules to define a logic flow for the omnichannel conversational application that includes the first channel and at least a second channel.

19. A computing system including a processor and memory configured to perform operations comprising:
enabling a user to select a plurality of functional modules from a library of functional modules;
enabling the user to arrange the plurality of functional modules to form an omnichannel conversational application that includes a first channel and at least a second channel;
enabling the user to initiate a session of the omnichannel conversational application in the first channel;
switching subsequently the session of the omnichannel conversational application to the at least a second channel; and
continuing the session of the omnichannel conversational application using the at least a second channel without restarting the session.

20. The computing system of claim 19 wherein the first channel and at least a second channel include two or more of: an Interactive Voice Response (IVR) channel; a Short Message Service (SMS) channel; a mobile-based channel; and a web-based channel.

21. The computing system of claim 19 wherein the omnichannel conversational application includes one or more of:
an audio-based communication modality; and
a visual-based communication modality.

22. The computing system of claim 21 wherein the audio-based communication modality includes one or more of:
recorded audio segment functionality; and
text-to-speech functionality.

23. The computing system of claim 21 wherein the visual-based communication modality includes one or more of:
JavaScript Object Notation (JSON) text-based functionality; and
HyperText Markup Language (HTML)/Synthesis Markup Language (SSML) text-based functionality.

24. The computing system of claim 19 wherein the library of functional modules includes:
one or more predefined functional modules; and
one or more user-defined functional modules.

25. The computing system of claim 24 further comprising:
enabling the user to define the one or more user-defined functional modules.

26. The computing system of claim 19 wherein enabling the user to arrange the plurality of functional modules to form an omnichannel conversational application that includes a first channel and at least a second channel includes:
enabling the user to visually arrange the plurality of functional modules to form the omnichannel conversational application that includes the first channel and at least a second channel.

27. The computing system of claim 26 wherein enabling the user to visually arrange the plurality of functional modules to form the omnichannel conversational application that includes the first channel and at least a second channel includes:
enabling the user to visually arrange the plurality of functional modules to define a logic flow for the omnichannel conversational application that includes the first channel and at least a second channel.

* * * * *